United States Patent Office 3,586,733
Patented June 22, 1971

3,586,733
OXIDATIVE DEHYDROGENATION OF PARAFFINS
James E. Connor, Jr., Wynnewood, Alfred F. D'Alessandro, Havertown, Harold Shalit, Drexel Hill, and Edward S. J. Tomezsko, Media, Pa., assignors to Atlantic Richfield Company, New York, N.Y.
No Drawing. Filed July 24, 1969, Ser. No. 844,608
Int. Cl. B01j 11/56; C07c 5/18, 11/06
U.S. Cl. 260—683.3  10 Claims

ABSTRACT OF THE DISCLOSURE

Method for the oxidative dehydrogenation of paraffins to produce olefins by contacting the paraffins with molecular oxygen, in the presence of molten alkali metal hydroxides, and aluminum or activated alumina.

BACKGROUND OF THE INVENTION

Field of the invention

This invention relates to a method for the dehydrogenation of paraffins, particularly propane to produce olefins by contacting the paraffins with molecular oxygen in the presence of molten alkali metal hydroxide, and aluminum metal or activated alumina.

Prior art

No prior art is known or has been found which is pertinent to the oxidative dehydrogenation of paraffins utilizing the molecular oxygen, molten alkali metal hydroxide, aluminum or activated alumina system of this invention. U.S. Pat. 3,207,805 discloses a process for the oxidative dehydrogenation of low molecular weight organic compounds, however, such process differs from the instant process in many particulars, but most importantly by the use of an ammonium halide in the reaction mixture. Such compounds are not required in the instant process.

SUMMARY OF THE INVENTION

In accordance with this invention a gaseous mixture of a paraffin having from 2 to 12 carbon atoms, preferably from 3 to 6 carbon atoms, together with molecular oxygen is passed through a bed of molten alkali metal hydroxide, preferably sodium hydroxide, and aluminum metal or activated alumina thereby dehydrogenating the paraffin to olefin.

It is an object of this invention therefore to provide a method for the oxidative dehydrogenation of paraffins.

It is another object of this invention to provide a method for the oxidative dehydrogenation of paraffins to olefins utilizing molecular oxygen.

It is another object of this invention to provide a method for the oxidative dehydrogenation of paraffins to olefins utilizing molecular oxygen, molten alkali metal hydroxide, aluminum metal or activated alumina.

Other objects of this invention will be apparent to those skilled in the art from the description of the preferred embodiments and from the claims.

DESCRIPTION OF THE PREFERRED EMBODIMENTS

The paraffins (alkanes) which can be dehydrogenated in accordance with this invention include those having from 2 to 12 carbon atoms and they may be straight chain or branched chain with straight chain paraffins being somewhat more preferred. In particular, the preferred paraffins are those having from 3 to 6 carbon atoms in the molecule. The most preferred single paraffin is propane.

The molecular oxygen is preferably diluted with an inert gas such as nitrogen. In general, the volume ratio of oxygen to nitrogen can vary from about 1.2 to 1:6 but preferably it is about 1:4 since this provides a safety factor relative to the explosive limits of the hydrocarbon-oxygen mixture. Air has been found to be a satisfactory source of molecular oxygen.

It has been found that sodium hydroxide is the preferred alkali metal hydroxide. Lithium hydroxide is not preferred since it does not form a peroxide. Potassium hydroxide, rubidium hydroxide and cesium hydroxide all exhibit a property known as "melt creep." These molten hydroxides tend to creep up the walls of the reaction vessel and rather quickly block the inlet tubes, etc., particularly when ceramic reaction vessels are employed. For this reason these hydroxides are not preferred and, moreover, the rubidium and cesium hydroxides are expensive.

The hydroxide is kept in a molten condition while carrying out the reaction. If metallic aluminum is employed it is preferably in the shape of small rings or irregular shapes in order to provide reaction surface while at the same time providing a packed condition which allows the free passage of gasses therethrough.

Instead of aluminum metal activated alumina such as commercially available can be utilized. Eta alumina of about 200 sq. meters per gram surface area has been found very satisfactory. In addition an inert packing agent such as tabular alumina may be employed in the reaction zone. This provides surfaces for reaction between the gases and a film of the molten alkali metal hydroxide on the packing surface.

It has been found that the reaction will not proceed without the use of the molecular oxygen. The volume ratio of hydrocarbon to oxygen has been found to be optimum for between about 1.8:1 and 5.0:1. If the oxygen is allowed to become depleted by having a ratio much above 5 volumes of hydrocarbon to one volume of oxygen other reactions characteristic of thermal cracking of the alkyl radical take place. For example, if propane is the hydrocarbon being employed and the oxygen becomes depleted below the 5:1 ratio, excessive methane is produced as one of the products in accordance with the well-known thermal cracking of the propyl radical. In consequence the selectivity for the production of olefins drops off sharply with decreased oxygen ratio. Accordingly, therefore, it is preferred to carry out the reaction at a sufficiently high space velocity and with a sufficiently short contact time to prevent the hydrocarbon to oxygen ratio from exceeding the 5:1 ratio.

The reaction may be carried out at temperatures ranging between about 390° C. and about 600° C. The preferred reaction temperature is between about 425° C. and 500° C. The most preferred range is between about 450° C. and 490° C.

Atmospheric pressure is preferred although higher pressures may be used consistent with flammability limits, in general, less than 100 p.s.i.

As has been pointed out the use of tabular alumina packing is not necessary, however, if it is desired to employ such a packing material its volume may range from one-half that of the volume of molten hydroxide to four times the volume of the hydroxide and preferably ranges from about one volume to 2½ volumes of tabular alumina per volume of molten sodium hydroxide.

The amount of aluminum or activated alumina need only be rather small, in general about 1 to 5 grams of aluminum or activated alumina per 100 ccs. of molten sodium hydroxide is satisfactory although larger quantities can be employed.

The gaseous hourly space velocity, i.e. volumes of gaseous feed per volume of molten sodium hydroxide per hour may range from 50 to 800 and preferably from 100 to 600 volumes of gaseous charge per volume of molten sodium hydroxide per hour. Preferably, however, as has been pointed out since the activity of the catalyst varies it is preferred to adjust the space velocity so that the amount of oxygen in the exit gas does not decrease below the ratio of 5:1 hydrocarbon to oxygen optimum ratio as described above.

In the following examples runs were carried out utilizing a vertical tubular reactor composed of high purity alumina which meausred about 40 inches in length by 1.5 inches in outside diameter. The reactor is provided with a concentric ceramic feed tube about ¼" outside diameter which extended to the bottom of the reactor and was provided with apertures at the bottom of the tube to provide a distribution means for the gaseous charge. The gaseous charge was passed downwardly through the feed tube and upwardly through a bed located in the annular space between the feed tube and the inner wall of the reactor. The bed consisted of a bottom layer of aluminum metal rings obtained by cutting an aluminum tube about ³⁄₁₆ inch outside diameter by ⅛ inch inside diameter to about ¼ inch ring lengths. Above the rings there was provided a layer of tabular alumina (8–14 mesh). When activated alumina was used the aluminum rings were replaced by the activated alumina. In this reactor 100 ml. of molten caustic filled the space between the rings and between the particles of packing and extending upwardly in the tube in the annular space. In some instances sufficient packing was utilized so that the packing extended above the layer of the molten caustic while in other runs smaller amounts of packing were used so that the molten caustic layer was above the top of the packing layer. The outside of the reactor tube was surrounded with three heaters so that the temperature of the reaction could be controlled uniformly to the desired level throughout the reaction zone. The top of the reactor tube is provided with conventional fittings to remove the reaction products. In the runs shown in the following examples a reaction temperature of 490° C. was utilized in order to make comparisons of the other variables. Runs have been made in the broad range and in the preferred range with the preferred and most preferred temperatures giving the best results.

It has been found that there is an induction period required to start up the reaction. The fresh reactor assembly is preoxidized by passing oxygen through the assembly for several hours, generally overnight. Thereafter the feed gas consisting of the hydrocarbon, oxygen and nitrogen is passed through the reactor for several additional hours before high conversions are attained. Although the reason for this induction period is not known, it is believed that this is necessary to form the catalyst system, the actual nature of which has yet to be ascertained, however, it is most probably an activated form of aluminum oxide.

In the following examples runs are shown utilizing the apparatus described. These runs illustrate specific embodiments of the invention and show the preferred conditions for carrying out the reaction of this invention. These runs should not be construed as limiting the invention solely to their disclosure however.

EXAMPLE I

The fresh reactor asesmbly consisted of 100 ml. of molten sodium hydroxide, 350 ml. of tabular alumina and 5 grams of aluminum rings. Pure oxygen was passed through the reactor for two hours at a temperature of 490° C. then a mixture of 40 volume percent propane, 12 volume percent oxygen and 48 volume percent nitrogen was passed through the reactor. A gaseous hourly space velocity of 110 was utilized. The results obtained are set forth in run No. 1 in Table I.

It will be seen that a very high total olefin selectivity is obtained and an excellent propylene selectivity is obtained.

The introduction of propane was discontinued and the mixture of oxygen and nitrogen was passed through the apparatus for 16 hours at 490° C. Propane was again introduced along with the oxygen and nitrogen as before for 2 hours, at a gaseous hourly space velocity of 100. The results are shown in run No. 2 in Table I.

In order to simulate a second stage reactor the amounts of propane and propylene obtained from the reactor during the previous two hours run (run No. 2) was introduced into the reactor together with the same amount of oxygen and nitrogen as had been introduced into the previous two hour run (run No. 2). This, of course, resulted in a lower gaseous hourly space velocity which in this case was 49. This run, run No. 3, was continued for three hours and the results obtained are shown in Table I.

In order to simulate a third stage the amount of propane and propylene obtained in run No. 3 was determined and introduced into the reactor again with the same quantity of oxygen and nitrogen as used in each of the previous two runs, run Nos. 2 and 3. The results obtained are shown in run No. 4 of Table I.

The reactor was then again subjected to 16 hours of oxidation utilizing the 4:1 volume ratio of nitrogen to oxygen and a temperature of 490° C.

The original mixture of propane, oxygen and nitrogen as utilized in run No. 1 was then introduced for three hours and the results obtained are shown in Table I, run No. 5. Again second and third stage simulation runs were carried out as described above and the results obtained are shown in Table I, run Nos. 6 and 7.

TABLE I

| | | Percent | | | | |
|---|---|---|---|---|---|---|
| | GHSV [1] | $C_3H_8$ conversion [2] | $C_3H_6$ selectivity [3] | Yield $C_3H_6$ [4] | $C_3H_6+C_2H_4$ selectivity [5] | Yield $C_3H_6+C_2H_4$ [6] |
| Run No. | | | | | | |
| 1 | 110 | 15.7 | 75.8 | 11.9 | 96.1 | 15.1 |
| 2 | 101 | 12.15 | 79.2 | 9.7 | 97.0 | 11.8 |
| 3 | 49 | 22.8 | 76.8 | 17.5 | | |
| 4 | 31 | 31.0 | 66.2 | 20.6 | | |
| 5 | 102 | 11.4 | 78.3 | 9.0 | 97.3 | 11.1 |
| 6 | 51 | 22.0 | 69.2 | 15.2 | | |
| 7 | 34 | 30.9 | 63.0 | 19.5 | | |

[1] GHSV = gaseous hourly space velocity.

[2] Percent $C_3H_8$ conversion = $\frac{C_3H_8 \text{ in} - C_3H_8 \text{ out}}{C_3H_8 \text{ in}} \times 100$, by volume.

[3] Percent $C_3H_6$ selectivity = $\frac{C_3H_6 \text{ out}}{C_3H_8 \text{ in} - C_3H_8 \text{ out}} \times 100$, by volume.

[4] Percent yield $C_3H_6 = \frac{C_3H_6 \text{ out}}{C_3H_8 \text{ in}} \times 100$, by volume.

[5] Percent $C_3H_6 + C_2H_4$ selectivity = $\frac{C_3H_6 \text{ out} + C_2H_4 \text{ out}}{C_3H_8 \text{ in} - C_3H_8 \text{ out}} \times 100$, by volume.

[6] Percent yield $C_3H_6 + C_2H_4 = \frac{C_3H_6 \text{ out} + C_2H_4 \text{ out}}{C_3H_8 \text{ in} - C_3H_8 \text{ out}} \times 100$, by volume.

The results of these runs demonstrate that reactors in series can be employed or alternatively that oxygen gas can be injected at successive points into a single reactor and that the propylene selectivity is maintained for considerable periods of time. These results also show that the propylene selectivity can be restored by an oxidation treatment between runs.

It is theorized that the oxidation regenerates the small quantities of catalyst required for the reaction to replace that lost by conversion to inert compounds and to regenerate the peroxide level in the molten sodium hydroxide. The catalyst for this reaction, it is believed, consists of a highly active form of alumina produced by the combination of sodium hydroxide, aluminum and oxygen. This theory is further substantiated by the fact that activated alumina also can be utilized in place of the aluminum metal but in all cases a period of time is initially required to form the catalyst by contact between the aluminum or aluminum oxide with the sodium hydroxide and oxygen. Thus during reaction it is believed the active form of the alumina which acts as the catalyst is slowly converted to sodium aluminate which is inactive for the process. In order to regenerate the catalyst terefore a periodic oxidation step is required during which no hydrocarbon feed is introduced. This oxidation step produces at most only millimoles of catalyst which, however, is sufficient for several hours of operation in converting the saturated hydrocarbon to its corresponding olefin.

EXAMPLE II

Another series of runs were carried out using propane and oxygen and nitrogen as in Example I, but with various amounts of tabular alumina packing. In all these runs the amount of sodium hydroxide was 100 ml. and the amount of aluminum rings was 5 grams. Each run was for from 3 to 4 hours and a reaction temperature of 490° C. and a gaseous hourly space velocity of 100 were employed. The results are shown in Table II, with conversion, selectivities and yields being calculated in the same manner as in Example I.

TABLE II

|  | Tabular $Al_2O_3$, Vol. ml. | Percent | | | | | |
|---|---|---|---|---|---|---|---|
|  |  | Conversion $C_3H_8$ | Selectivity | | Yield | | |
|  |  |  | $C_3H_6$ | $C_3H_2+C_2H_4$ | $C_3H_6$ | $C_2H_4$ | Total |
| Run No.: |  |  |  |  |  |  |  |
| 8 | 0 | 19.69 | 71.70 | 93.09 | 14.12 | 4.21 | 18.33 |
| 9 | 75 | 32.24 | 58.00 | 87.34 | 18.70 | 9.46 | 28.16 |
| 10 | 150 | 34.36 | 52.4 | 87.4 | 18.0 | 12.0 | 30.0 |
| 11 | 250 | 19.55 | 70.6 | 93.1 | 13.8 | 4.4 | 18.2 |
| 12 | 250 | 12.8 | 75.5 | 95.4 | 9.7 | 2.5 | 12.2 |

Propane conversion appears to be dependent upon the ratio of the liquid NaOH volume to the tabular alumina packing volume with an optimum at about 1.0:1.5.

EXAMPLE III

Two series of runs were carried out in the same manner as in Example I using the same propane, oxygen, nitrogen mixture and simulated second stage in run 14 and second, third and fourth stage in run Nos. 16, 17, and 18 respectively. In run Nos. 13 and 14 the reactor contained 100 ml. molten sodium hydroxide, 250 ml. tabular alumina packing and 50 grams of aluminum rings. In run No. 13 a gaseous hourly space velocity of 100 was employed and in run No. 14 a gaseous hourly space velocity of 50 was employed. In run Nos. 15, 16, 17 and 18 the reactor contained 100 ml. of molten sodium hydroxide, 350 ml. of tabular alumina packing and 5 grams of aluminum rings. The gaseous hourly space velocity in run No. 15 was 100, in run No. 16 it was 50, in run No. 17 it was 33 and in run No. 18 it was 25. The runs were for 2 hours each at 490° C. and the results calculated as in Example I are shown in Table III.

TABLE III

| Run No. | Percent | | | | |
|---|---|---|---|---|---|
|  | $C_3H_8$ conversion | $C_3H_6$ selectivity | Yield $C_3H_6$ | $C_3H_6+C_2H_4$ selectivity | Yield $C_3H_6+C_2H_4$ |
| 13 | 11.6 | 77.2 | 8.9 | 96.7 | 11.1 |
| 14 | 20.4 | 74.8 | 15.3 |  |  |
| 15 | 12.8 | 75.5 | 9.7 | 95.4 | 12.2 |
| 16 | 21.8 | 65.7 | 14.4 |  |  |
| 17 | 28.1 | 68.7 | 19.3 |  |  |
| 18 | 34.8 | 62.8 | 21.8 |  |  |

It will be seen that, in general, reactors which are multistaged with oxygen, yield higher propylene selectivities at equivalent conversions as compared with single stage high conversion per pass reactors shown in Example II.

EXAMPLE IV

In order to show that an induction period is required for the formation of the catalyst system three runs were carried out using the same propane, oxygen and nitrogen mixture as in Example I, with a temperature of 490° C. and a gaseous hourly space velocity of 100. In each run 100 ml. of molten sodium hydroxide was used. In run No. 19 no tabular alumina packing was employed and 5 grams of aluminum rings were used. In run No. 20, 150 ml. of tabular alumina and 50 grams of aluminum rings were used. In run No. 21, 250 ml. of tabular alumina and 5 grams of aluminum rings were used. Conversions, selectivity and yield were determined after each hour of the run and are shown in Table IV.

TABLE IV

| Run No.: | Hour No. | Percent | | |
|---|---|---|---|---|
|  |  | $C_3H_8$ conversion | $C_3H_6$ selectivity | Yield $C_3H_6$ |
| 19 | 1 | 6.9 | 84.9 | 5.8 |
|  | 2 | 8.3 | 83.2 | 6.9 |
|  | 3 | 8.4 | 82.1 | 6.9 |
| 20 | 1 | 7.1 | 79.0 | 5.6 |
|  | 2 | 7.8 | 79.2 | 6.2 |
|  | 3 | 13.0 | 76.5 | 9.9 |
|  | 4 | 12.9 | 76.0 | 9.8 |
| 21 | 1 | 10.0 | 82.4 | 8.2 |
|  | 2 | 11.3 | 80.7 | 9.1 |
|  | 3 | 14.3 | 76.2 | 10.9 |
|  | 4 | 18.0 | 73.9 | 13.3 |
|  | 5 | 20.9 | 70.0 | 14.7 |

These results show a progressive increase in conversion and yield with time demonstrating that an induction period is required for catalyst formation.

EXAMPLE V

In order to demonstrate that activated alumina can be used instead of aluminum metal a series of 2-hour runs were carried out wherein the reactor contained 50 ml. of molten sodium hydroxide, 150 ml. of tabular alumina and 10 grams commercial eta-alumina (8–14 mesh) having a surface area of 200 sq. meters/gram. The same feed mixture and reaction temperature as in Example I was employed. The gaseous hourly space velocities were varied as shown in Table V. The results are shown in Table V.

TABLE V

| | | Percent | | | | | |
|---|---|---|---|---|---|---|---|
| | GHSV [1] | Conversion $C_3H_8$ | Selectivity | | Yield | | |
| | | | $C_3H_6$ | $C_3H_2+C_2H_4$ | $C_3H_6$ | $C_2H_4$ | Total |
| Run No.: | | | | | | | |
| 22 | 200 | 32.13 | 56.30 | 87.99 | 18.09 | 10.18 | 28.27 |
| 23 | 389 | 35.07 | 54.8 | 88.0 | 19.21 | 11.66 | 30.87 |
| 24 | 603 | 38.4 | 50.2 | 87.7 | 19.3 | 14.4 | 33.7 |
| 25 | 796 | 37.1 | 50.6 | 86.9 | 18.7 | 13.5 | 32.2 |
| 26 | 1,020 | 12.6 | 76.7 | 92.3 | 9.7 | 2.0 | 11.7 |

[1] GHSV=gaseous hourly space velocity.

These results show that the activated alumina gives a high activity reactor at high space rates. The slight increase in conversion with increasing space velocity is attributed to improved gas-liquid contact in the packing up to about 800 gaseous hourly space velocity. Above this point the molten sodium hydroxide is blown out of contact with the catalyst bed and complete combustion of the alkane occurs.

EXAMPLE VI

A run was carried out as in Example V but no molten sodium hydroxide was employed. A gaseous hourly space velocity equivalent to 100 was employed. A 9 percent conversion was obtained with a 30 percent selectivity and complete utilization of the oxygen. This example demonstrates the necessity of employing molten alkali metal hydroxide in the reaction.

We claim:
1. A method for the oxidative dehydrogenation of alkanes having from 2 to 12 carbon atoms which comprises reacting said alkane at a temperature ranging between about 390° C. and about 600° C. with molecular oxygen with a volume ratio of alkane to oxygen between about 1.8:1 and 5.0:1 in the presence of molten alkali metal hydroxide and aluminum or activateed alumina.
2. The method according to claim 1 wherein the alkali metal hydroxide is sodium hydroxide and the temperature is in the range of 425° C. to 500° C.
3. The method according to claim 1 wherein the alkali metal hydroxide is sodium hydroxide and the temperature is in the range of from 450° C. to 490° C.
4. The method according to claim 1 wherein the alkanes contain from 3 to 6 carbon atoms.
5. The method according to claim 1 wherein the reaction is carried out in the presence of aluminum.
6. The method according to claim 1 wherein the reaction is carried out in the presence of activated alumina.
7. The method according to claim 1 wherein the alkane is propane.
8. The method according to claim 7 wherein the alkali metal hydroxide is sodium hydroxide.
9. The method according to claim 7 wherein the temperature is in the range of from 450° C. to 490° C., the alkali metal hydroxide is sodium hydroxide and aluminum is used in the reaction.
10. The method according to claim 7 wherein the temperature is in the range of from 450° C. to 490° C., the alkali metal hydroxide is sodium hydroxide and activated alumina is used in the reaction.

References Cited

UNITED STATES PATENTS 3,207,805  9/1965  Gay _____ 260—680
3,449,458  6/1969  Tiedje et al. _____ 260—669

DELBERT E. GANTZ, Primary Examiner

G. E. SCHMITKONS, Assistant Examiner

U.S. Cl. X.R.

260—680E